March 16, 1943.    J. A. COXE ET AL    2,314,032
FISHING REEL
Filed Jan. 26, 1940    5 Sheets-Sheet 1

Inventors:
Joseph A. Coxe and
Richard P. McMahon
By Freeman, Sweet, Albrecht & Weidman
Attys.

March 16, 1943.   J. A. COXE ET AL   2,314,032
FISHING REEL
Filed Jan. 26, 1940   5 Sheets-Sheet 2
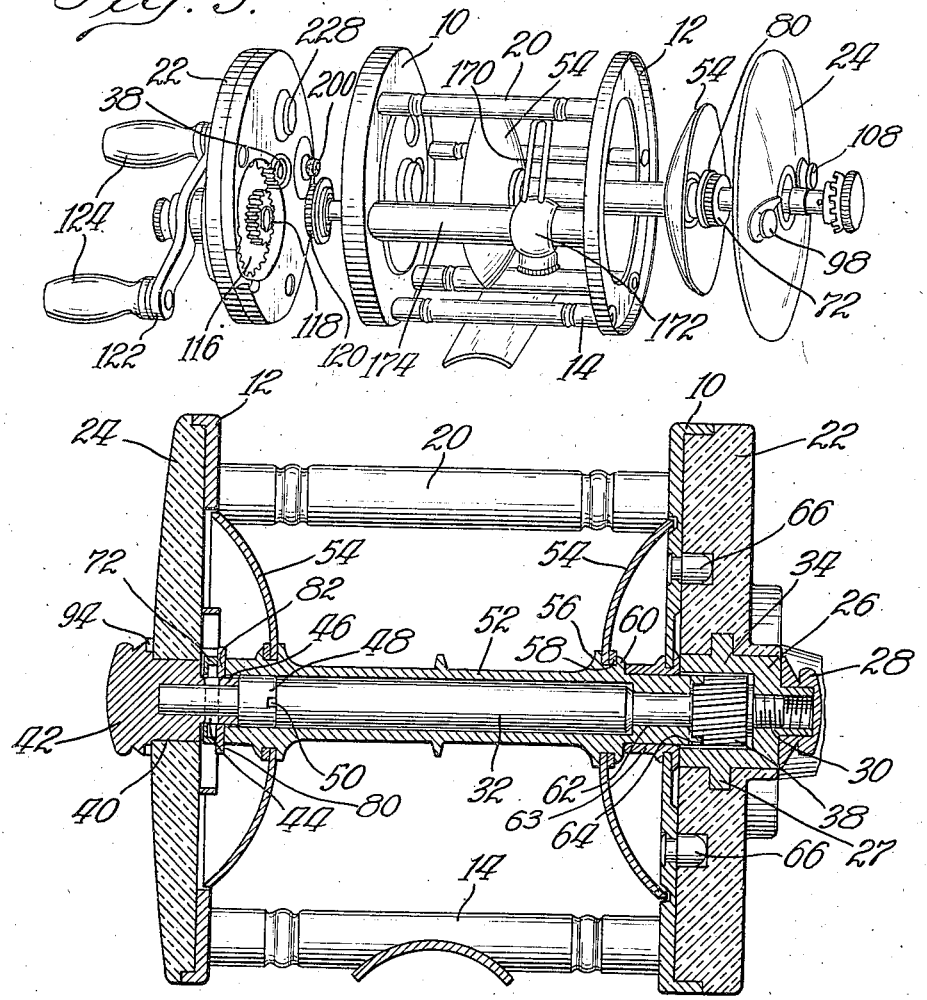
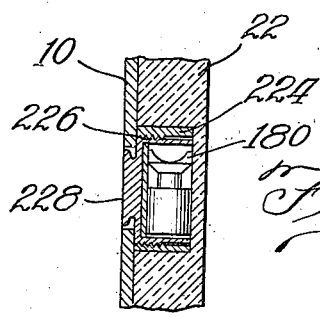
Inventors:
Joseph A. Coxe and
Richard P. McMahon
By: Freeman, Sweet, Albrecht & Weidman
Attys.

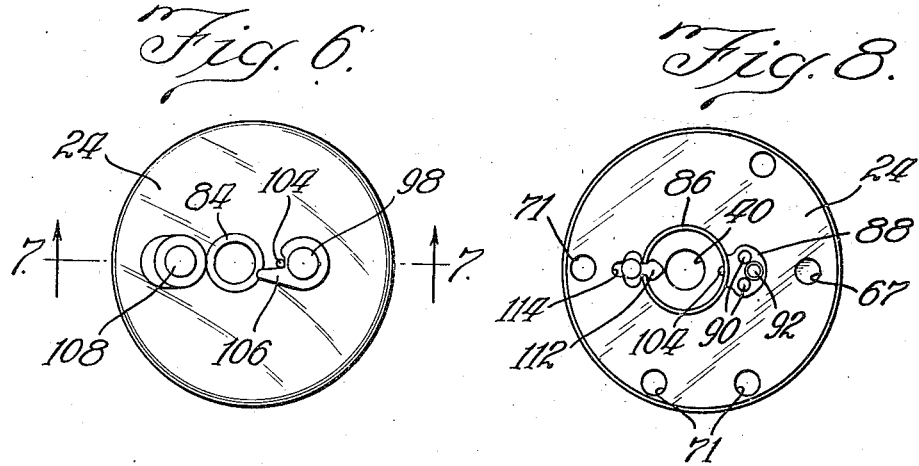
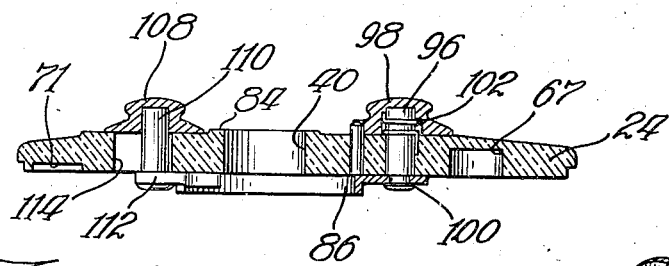
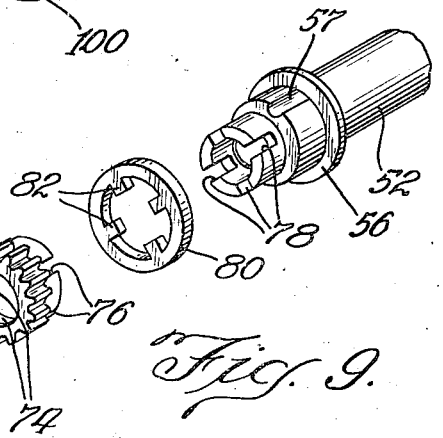
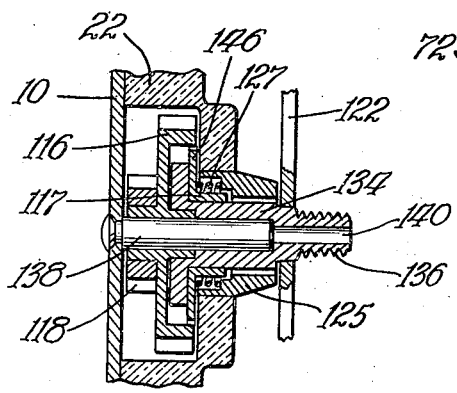

March 16, 1943.  J. A. COXE ET AL  2,314,032
FISHING REEL
Filed Jan. 26, 1940  5 Sheets-Sheet 4
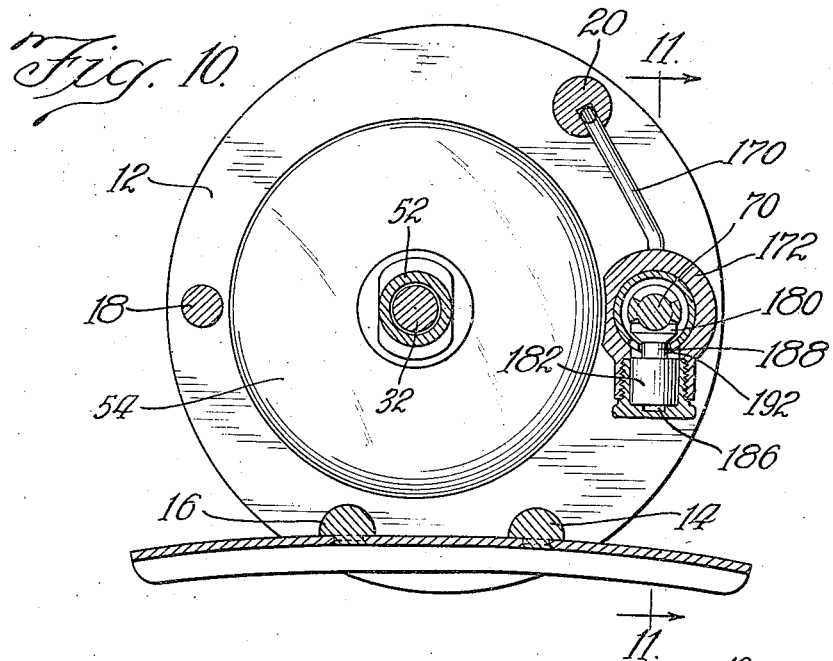
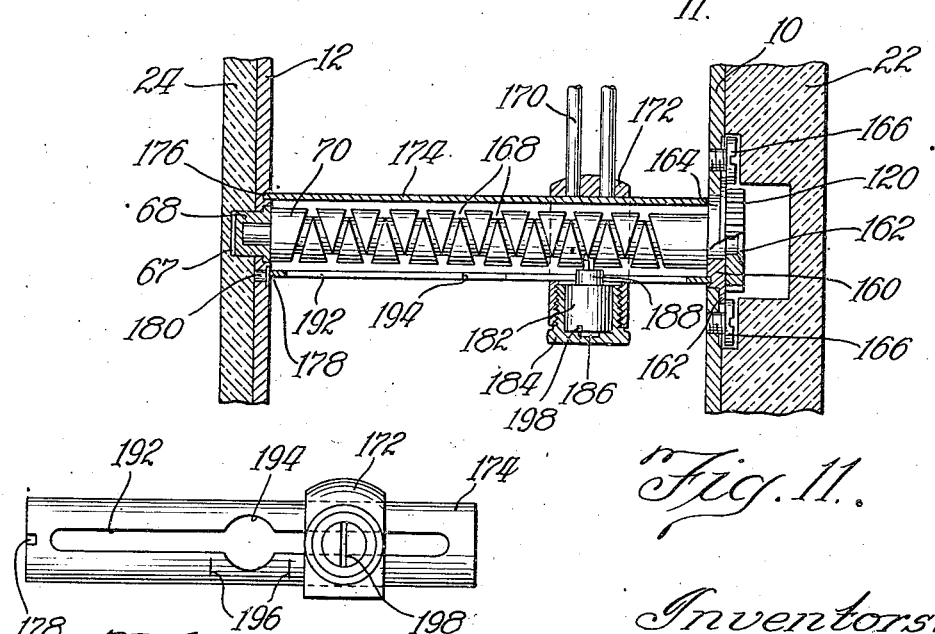
Inventors:
Joseph A. Coxe and
Richard P. McMahon
By: Freeman, Sweet, Albrecht & Weidman
Attys.

March 16, 1943.  J. A. COXE ET AL  2,314,032
FISHING REEL
Filed Jan. 26, 1940  5 Sheets-Sheet 5
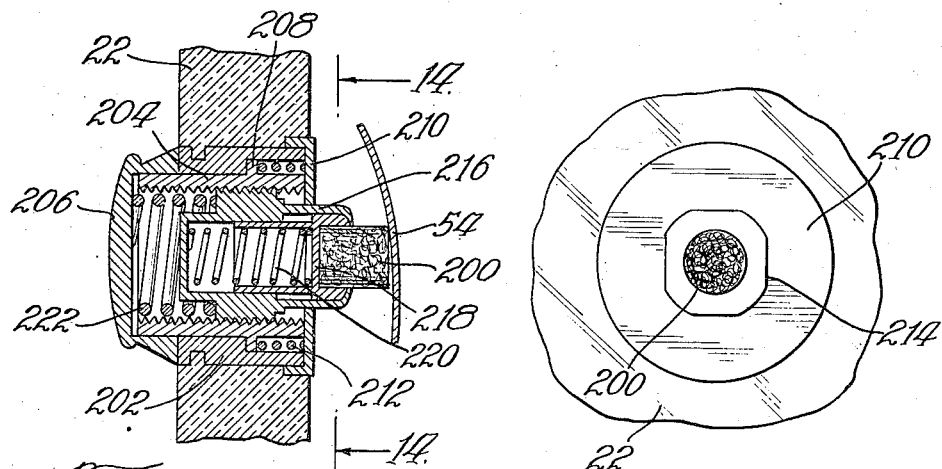
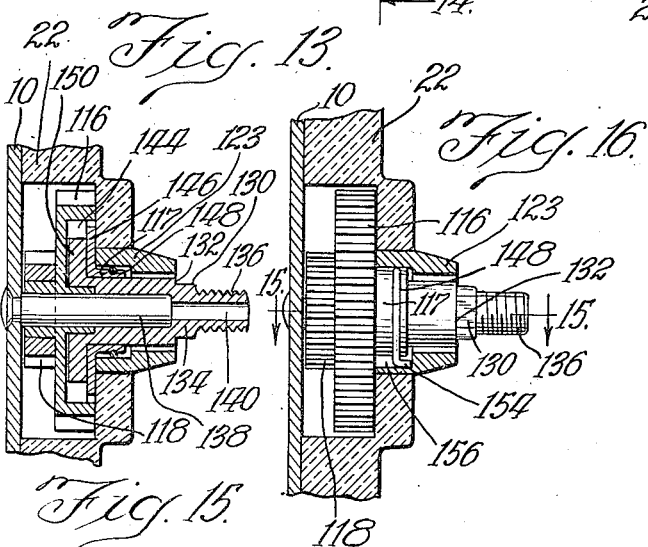
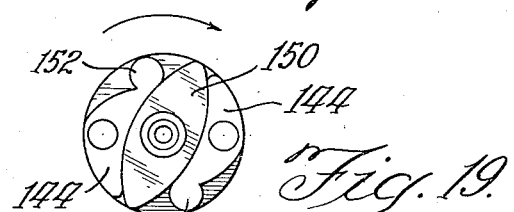
Inventors:
Joseph A. Coxe and
Richard P. McMahon
By: Freeman, Sweet, Albrecht & Weidman
Attys.

Patented Mar. 16, 1943

2,314,032

UNITED STATES PATENT OFFICE 2,314,032

FISHING REEL

Joseph A. Coxe, Los Angeles, Calif., and Richard P. McMahon, Bronson, Mich., assignors to Bronson Reel Company, Bronson, Mich., a corporation of Michigan Application January 26, 1940, Serial No. 315,820

16 Claims. (Cl. 242—84.1)

Our invention relates to fishing reels, and includes among its objects and advantages a simplification and increase in the durability and freedom from accidental injury and wear in the type of reel commonly referred to as a level wind reel, and usually, but not necessarily, employed for casting or trolling in fresh water.

In the accompanying drawings:

Figure 3 is a perspective view of the same reel, partially disassembled;

Figure 4 is a section through the spool shaft;

Figure 5 is a detailed section on line 5—5 of Figure 2;

Figure 6 is an outside end view of the tail plate and parts carried thereby;

Figure 7 is a section on line 7—7 of Figure 6;

Figure 8 is a view of the inner face of the tail plate and parts carried thereby;

Figure 9 is a perspective view of the click wheel end of the spool sleeve, with the parts partially disassembled;

Figure 10 is a transverse section on line 10—10 of Figure 1;

Figure 11 is a detailed section on line 11—11 of Figure 10;

Figure 12 is a bottom view of the sleeve and level wind carriage with the retaining cap removed;

Figure 13 is a detailed section on line 13—13 of Figure 2;

Figure 14 is a section on line 14—14 of Figure 13;

Figure 15 is a section through the drive crankshaft on line 15—15 of Figure 16;

Figure 16 is a view of the same parts in elevation;

Figure 17 is a view of the parts illustrated in Figure 16 from the crank end;

Figure 18 is a diagram of the driving pawls in operative position;

Figure 19 is a view of the same parts with the pawls in inoperative position; and Figure 20 is a section similar to Figure 15, showing an alternative arrangement for the biasing spring.

Framework

Figure 1:
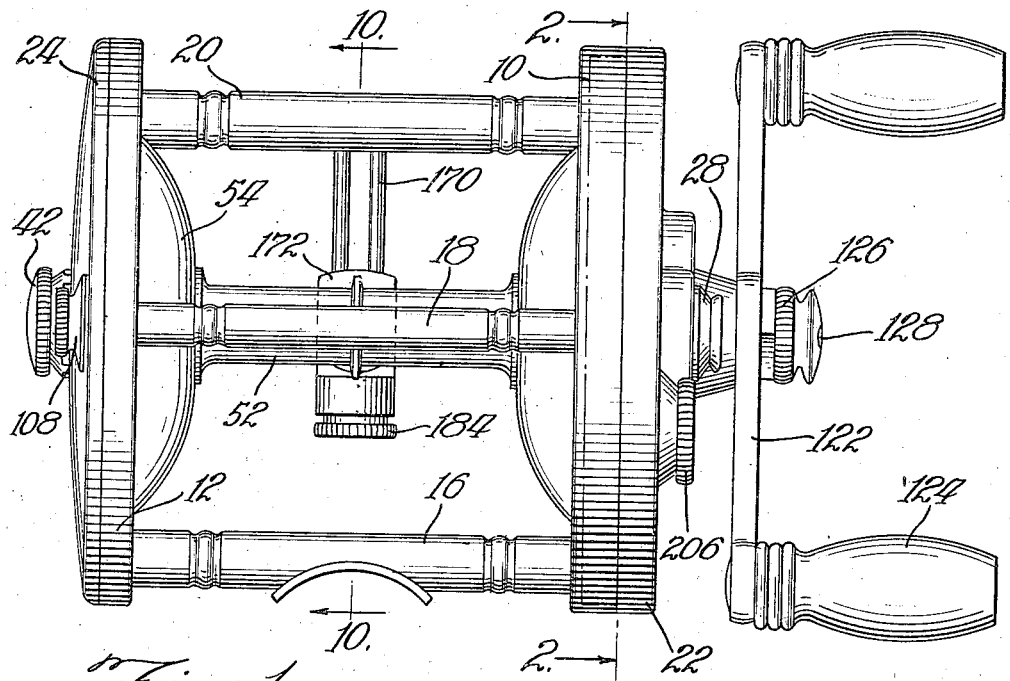
Figure 1 is a rear elevation of a reel according to the invention.

In the embodiment of the invention selected for illustration there is provided a frame made up of a head plate 10 and a tail ring 12 interconnected by four pillars 14, 16, 18, and 20, which pillars have their ends riveted into or otherwise permanently assembled with the head plate 10 and tail ring 12 to form a rigid assembly which can not be disassembled by the user.

With the head plate 10 is associated a housing 22, and with the tail ring 12 is associated a tail plate 24. The housing 22 and plate 24 may be metallic or non-metallic. In the embodiment illustrated they are non-metallic. In the head housing 22 there is integrally assembled a supporting nut 26. When the housing 22 is non-metallic, the nut 26 carries a flange 27 embedded in the material of the housing and notched as indicated in dotted lines in Figure 2, to prevent rotation and provide clearance for adjacent parts. The nut 26 is threaded throughout its length and the opening is closed by the cap 28. It includes a threaded socket 30 to receive the threaded end of the cross bolt 32, and a sleevelike portion 34 partly cut away as clearly shown at 36 in Figure 2 to expose the pinion 38 by means of which the spool is driven. The tail plate 24 is provided with a bore 40 to receive the large cylindrical portion of the bolt head 42, which head is integrally assembled with the shaft 32 as by means of a rivet 44. Between the end of the sleeve 46 forming the inner end portion of the head 42 and receiving the rivet 44, and the enlarged central portion of the bolt 32, there is provided an intermediate bearing member 48, which bearing member has at least one oil notch at 50.

Except for the bearing 48, no portion of the bolt assembly just described rotates when the spool is turning. The spool proper comprises a sleeve 52 and annular end bells 54, the inner edges of which lie between integral flanges 56 on the sleeve 52 and retaining washers 58 anchored by swaged over portions 60 of the sleeve 52. The sleeve portion receiving the end bell has a groove at 57 (see Figure 9) and the holes in the end bell and washer are shaped to fit this irregularity and keys the parts together.

At the head end, the inside diameter of the sleeve 52 is decreased to define a bearing portion 62, which is accurately machined with respect to the shaft portion inside it to have the proper clearance for suitable lubrication and durability. Beyond the bearing portion 62 the sleeve terminates in two projecting clutch teeth 64 engaging notches in the pinion 38. Throughout the length of the enlarged portion 32, the clearance between the bolt and the shaft is materially greater and such that there is no load-bearing contact between the parts. However, this space constitutes an oil reservoir, and in use the film of lubricant in this reservoir provides a slight but very desirable hydraulic damping action to steady the motion of the spool. The sleeve 52 and the bolt are of different metals, for instance nickel silver for the sleeve and steel for the bolt, selected particularly to provide a better polishing and anti-friction contact at the bearing 62 than can be secured with metals of the same analysis. Similarly, the intermediate bearing 48 is of bronze, and has its outer diameter accurately machined to be a light push fit in the sleeve 52; and its inner bore accurately machined for the best lubricated running contact with the bolt 32. In practical use it is found that there is no relative rotation between the sleeve 48 and the sleeve 52.

Integrally assembled with the head plate 10 is an outer bronze bearing sleeve 63 encircling the sleeve 52 in the transverse plane of the bearing 62. With the integrally riveted pillars described, it is possible to have the bearing 64 clear the outer diameter of the sleeve 52 to a sufficient extent to carry no load during casting or the play of the ordinary fish, and at the same time to be close enough to the sleeve 52 so that when by some unfortunate accident, especially when an inexperienced fisherman is using the reel with a line heavier than that for which it was designed, and happens to hook a fish or a snag so as to overload the reel, the resilience of the housing 22 and of the bolt portion between the bearing 62 and the threaded end 30 is such that the bearing at 63 can help carry on abnormal load and reduce or prevent injury to the reel as a result of such overload. The bearing 63 is also helpful in holding the spool in substantially exact alignment when the bolt is withdrawn during the process of disassembling and assembling, and takes the end thrust of the spool when the reel is assembled. This relieves the driving pinion 38 of all axial load.

The housing 22 is oriented with respect to the head plate 10 by means of bosses 66 integrally assembled with the head plate, which bosses enter cooperating sockets in the body of the head housing 22. The tail plate 24 has a single similar socket 67 to receive a boss formed by the projecting portion of the tail end bearing 68 for the level wind shaft 70 (see Figures 7, 8, and 11). The tail plate also has shallower depressions 71 to provide clearance for the riveted ends of the pillars.

*Click and bolt lock*

The click wheel 72 (see Fig. 9) is an annulus having an axially projecting flange 74 containing four equally spaced slots 76. The teeth of the click wheel project radially outward beyond the flange 74, and the annulus also projects inward to provide a shoulder for abutment with the segments between slots 78 in the adjacent end of the sleeve 52. The flange 74 is so formed as to telescope outside the end portion of shaft 52 containing the slots 78.

The locking spider 80 is an annulus encircling the flange 74 on its outer side and having four tangs 82 which project inwardly through the slots 76 and 78 and key the parts together.

Referring now more particularly to Figures 4, 6, 7, and 8, the tail plate 24 has an annular abutment face at 84 for the adjacent shoulder of the head 42. The click spring proper encircles the bolt 32 and comprises duplicate arcuate spring arms 86 and an anchoring flange 88 turned parallel to the end plate 24 and fastened to the same as by two short rivets 90 entering registering holes in the end plate 24. The pin 92 constitutes the pivot for the bolt locking pawl. The bolt head is serrated to provide notches 94 adjacent the face of the end plate 24. The pin 96 is integral with the pawl head 98 and is riveted over a washer 100 to fasten the parts in place. The spring 102 has one end socketed in the plate 24 and the other in the head 98 and urges the locking pawl in a clockwise direction as viewed in Figure 6. Pivotal movement of the pawl is restricted by the pin 104 seated in a notch in the edge of the head 98, and the side of the notch normally in contact with the pin is extended outward at 106 to engage the serrations 94 on the bolt head. Opposite the locking pawl 98 I provide a substantially similar head 108 integral with the pin 110 at the inner end of which is carried the click pawl proper 112. These parts are slidable toward and away from the axis of the spool by means of the slotted hole 114 receiving the pin 110, and the parts are resiliently held in operative or inoperative position by the click spring 86 itself.

*Transmission*

The drive means provided is shown in detail in Figures 2, 3, and 15 to 19, inclusive. The pinion 38 is of conventional design and meshes with the large drive gear 116. The pinion 118 is coaxial with the gear 116 and integrally assembled therewith and meshes with the pinion 120 on the level wind shaft 70. The crank 122 is provided with conventional handles 124 and a retaining nut 126 provided with a spring closed oil inlet at 128. It rides on a squared portion 130 and in abutment with a shoulder 132 on the main drive sleeve 134, which sleeve has a threaded end portion 136 to receive the nut 126. The sleeve 134 and the gear 116 and pinion 118 are all rotatably supported on the stud 138 integrally mounted in the head plate 10. At its outer end the sleeve 134 is provided with an axial bore at 140 to permit oil put in through the inlet 128 to have access to the moving parts.

The end of the central boss 117 of the gear 116 has axial abutment with the sleeve 134. Because this contact is at a small radius, friction is minimized whenever the inertia of the parts causes the gear and drive sleeve to be pressed against each other. Axial movement of the sleeve 134 and carrier 146 is limited in one direction by guiding contact between the carrier 146 and the housing 22, and in the other direction by guiding contact between the crank 122 and the housing extension 123, sufficient clearance being allowed to let the parts turn freely. The gears 116 and 118 have similar axial clearances between the plate 10 and the abutment at the end of the boss 117.

As clearly shown in Figure 17, the gear 116 has a central countersunk portion in the periphery of which are four equally spaced pawl-receiving cavities 142. Duplicate pawls 144 are carried by the flange 146 of the pawl sleeve 148. Integral with the sleeve 134 and lying between the pawls 144 is a drive head 150. It will be apparent that when the drive head 150 is pushing on the pawls 144 in the direction of the arrow of Figure 19, the pawls will swing to the position illustrated in that figure, and there will be no driving connection between the crank and the spool. Similarly, whenever the driving force is in the opposite direction, the parts will swing out into the position of Figures 18 and 17 and the heads 152 of the pawls 144 will be wedged into the cavities 142 and establish a positive driving connection. As a rule, inertia will tend to throw the parts from inoperative to operative position and vice versa, but to make the operation absolutely certain and infallible, we provide a very light drag spring for biasing the sleeve 148 against rotation in either direction with respect to the housing 22. As clearly illustrated in Figures 15, 16, and 17, this spring has a single toe 154 entering a notch 156 in the adjacent housing and is wrapped in a groove in the sleeve 148. The body 158 of the drag spring encircles the sleeve a little less than one revolution, and in such a direction that the friction between the spring and the sleeve tends to wrap the spring tighter around the sleeve when the parts are in driving position as in Figures 17 and 18. Inasmuch as the force of this spring need only overcome the inertia of the sleeve 148 and the pawls carried thereby, it can be made so light that its action is imperceptible to the user, and still function instantaneously and reliably. With actual devices according to the invention it is possible to move the parts to the position of Figure 19 with line on the spool and a weight on the end of the line sufficient to unwind the line, and, by a very slight initial movement of the crank, arrest the running out of line so instantaneously that without any appreciable practice the angler can check the fall of the weight at any desired point within about two inches.

Referring to Figure 18 it is noted that the driving force between the left pawl 144 and the gear 116 is transmitted by surfaces normal to the arrow 230. And the arrow 232 is normal to the adjacent contact surface where the head 150 and pawl 144 transmit driving force. Because the arrow 230 is more nearly tangential than the arrow 232, there is a wedging action on the pawl 144 that actively holds it in the position of Figure 18 so long as a load is being transmitted Therefore, if a fish in play is too strong for the tackle and has to be allowed to take out line, the angler can reel out without any danger of accidentally releasing the spool, so long as he maintains some load on the transmission, as by holding the crank and letting the crank move his hand in the direction of reeling out. This is the common way of playing a fish with a reel not provided with the improved mechanism herein disclosed. We are aware that automatic overriding clutches have often been proposed for reels of this sort, but all constructions of which we have knowledge have failed for one or more of three reasons: first, lack of an adequate locking action to prevent inadvertent disconnection when trying to let a heavy fish take out line; second, driving surfaces engaging at such acute angles that the scraping action soon abrades the metal and the devices wear out; and third, too great a relative movement involved in changing from free spool to driven spool.

As above explained, there is ample locking action in the structure disclosed, but with no load, the inertia of the parts plus the bias of the spring 148 is reliable and effective. In actual casting, the crank will occasionally turn as much as 60° as the angler releases the spool in casting, but the angler is quite unconscious of any such trifling displacement. And it will be seen on reference to Figure 18 that the parts engage at such angles that scraping action is impossible.

In the construction indicated in Figure 20, the housing extension 125 differs from the extension 123 of Figure 15 in being cut away to house the coil spring 127. This spring may be unattached at both ends, and merely rub on its abutments.

*Level wind*

The level wind mechanism is more particularly illustrated in Figures 10, 11, and 12. The drive shaft 70 is reduced in diameter at one end to receive the mounting ring 160 and the pinion 120 is assembled over the ring 160 and the parts permanently fastened in place, as by riveting over the end of the shaft. The supporting plate 160 includes a flange 162 lying against the face of the head plate 10 and a cylindrical portion 164 entering a close fitting aperture in the head plate 10. The parts are then clamped in assembled position by screws 166, the heads of which overlap the adjacent edge portions of the flange 162. It will be apparent that after removal of the housing 22, the subsequent removal of the screws 166 will permit the user to withdraw the shaft 70 and associated gears without disassembling the reel frame, at any time when the pawl is not enmeshed with the threads 168 of the shaft 70.

The conventional line-guiding loop 170 is supported by the carriage 172 and has its upper end slidably mounted in a slot in the pillar 20. On the side next the spool the carriage surface is concentric with the spool axis. The carriage 172 encircles and slides on a housing and protecting sleeve 174. At the head end this sleeve is received in an annular groove in the ring 160, and at the tail end the sleeve enters an annular groove 176 in the tail plate 12. The tail end of the sleeve is notched at one point in its periphery as indicated at 178 in Figure 12, and the tail plate 12 is bored and counter-bored to receive the headed index pin 180 adapted to enter the notch 178 and thus assure correct assembly of the parts and prevent rotation of the sleeve 174 during use. The head of the pin prevents accidental displacement of the pin when assembling the sleeve 174.

The pawl comprises a conventional thread-engaging blade 180 and a cylindrical body 182 rotatably supported in the retaining nut 184 threaded inside the body of the carriage 172 and provided with a central recess 186 functioning as an oil storage cavity. Between the body 182 and the blade 180, the pawl is reduced in diameter to define a neck 188. The sleeve 174 has a longitudinal slot 192 only wide enough to receive the neck 188 throughout most of its length. At a point intermediate its ends, the slot 192 may be enlarged as at 194 to facilitate insertion of the pawl. To guide the user in assembling the parts, light marks 196 are scored in the outer surface of the sleeve 174 to indicate the positions of the edges of the carriage 172 when the pawl is in register with the opening 194. The butt of the pawl is provided with a slot parallel to the blade 180 and adapted to receive a screw driver, or the like. When the pawl is inserted with the carriage over the opening 24, the slot is a guide for positioning the blade in alignment with the threads. However, by turning the blade completely parallel to the slot 192, it can be inserted at any point along the slot and then turned to position to slip into the threads.

*Drag*

Figure 2:
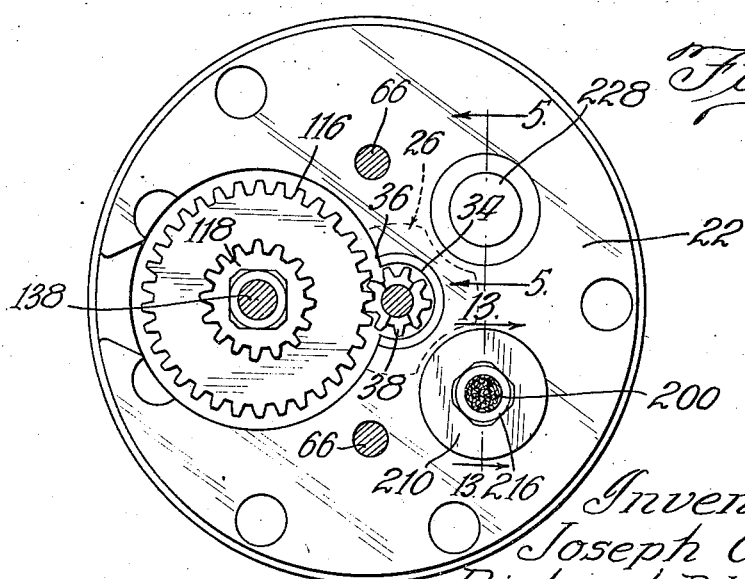
Figure 2 is a section on line 2—2 of Figure 1.

Referring now to Figures 2, 13, and 14, the drag provided includes the friction pad 200 adapted to rub against one of the adjacent end bells 54. The main housing for the drag mechanism is a sleeve 202 integrally assembled in the head housing 22. Rotatable in the housing 202 is an adjustment sleeve 204 carrying the integral knurled head 206 for manual adjustment thereof. The sleeve 204 is restrained against axial movement away from the spool by a shoulder 208 abutting a corresponding shoulder in the housing sleeve 204, and in the other direction by abutment of its end with the cover cap 210. To prevent accidental rotation of the parts, a helical spring 212 is housed between the cover cap 210 and the flange 208 to provide a friction load. The cover cap 210 has a non-circular hole at 214 through which slides the head portion of a plunger 216 carrying the friction pad 200. The plunger 216 has a threaded body engaging threads on the inside of the adjustment sleeve 204 so that rotation of the sleeve 204 will move the plunger toward and away from the adjacent end bell 54. The friction pad 200 is axially slidable in the head 216, being supported in a holder 218 slidable but not rotatable inside the plunger 216 and resiliently pressed in the direction of the end bell 54 by the light helical compression spring 220. To take up any looseness in the threads, a much stiffer helical compression spring 222 is positioned between the cap 206 and the plunger 216.

By reason of the small pitch of the threads, the range of adjustment of the device may be made to include several complete rotations of the head 206, but the head 206 has no axial movement and is at all times mounted closely adjacent the housing 22.

*Repair part*

Referring now particularly to Figure 5, within an otherwise unoccupied space in the head housing 22 we have provided a cavity with a liner 224 threaded to receive a pawl-holding cup 226 within which may be housed a spare pawl for the use of the fisherman in case the pawl in service should become bent or unserviceable for any reason, or should be lost or misplaced. The cup 226 is provided with a head 228 smaller than the diameter of the cup, and the head 228 lies in a registering opening in the head plate 10. During normal use of the reel, this cup is housed and covered by the adjacent end bell 54, and the cup is only accessible after the operator has first removed the housing 22 from the reel frame to secure access to the replacement pawl. This renders the equipment foolproof in the sense that the cup 226 is inaccessible during ordinary use of the reel and can not be inadvertently unscrewed with possible resultant loss of parts.

Without further elaboration the foregoing will so fully explain our invention that others may, by applying knowledge current at the time of application, readily adapt the same for use under various conditions of service. It will, for instance, be obvious that by changing the pawl 106 to a hooked shape moving toward and away from the axis of the bolt, the lock will prevent rotation of the bolt in either direction.

We claim:

1. In a fishing reel, in combination: a frame and housing assembly; a rotary spool in said assembly having an axially bored shaft; and a stationary bolt in said bore; said bolt constituting a pintle for said spool; said bolt having a bearing portion adjacent one end; then a reach portion; then a head portion including a shank of larger diameter than said reach portion; said reach having an annular groove adjacent said shank; and a ring fitting in said groove and having an outside diameter greater than said reach; said shaft having a bearing portion fitting the bolt bearing portion; a reach portion of larger diameter than said bolt reach and defining a storage space for lubricant between itself and said bolt reach, and a bearing portion fitting the outer surface of said ring.

2. In a fishing reel, in combination: a frame and housing assembly; a rotary spool in said assembly having an axially bored shaft; and a stationary bolt in said bore; said bolt constituting a pintle for said spool, said bolt having a bearing portion; then a reach portion; then a head portion including a shank of larger diameter than said reach portion; said reach having an annular groove adjacent said shank; and a ring fitting in said groove and having an outside diameter greater than said reach; said shaft having a bearing portion fitting the bolt bearing portion; a reach portion of larger diameter than said bolt reach and defining a storage space for lubricant between itself and said bolt reach, and a bearing portion fitting the outer surface of said ring; said bolt being of one metal; said shaft being of a second metal; and said ring being of a third metal; said three metals being steel, nickel silver, and bronze.

3. In a fishing reel spool, in combination: a tubular shaft; end bells on said shaft; said shaft having a projecting end portion; said end portion having four uniformly and symmetrically spaced keyways with their ends opening away from the adjacent end bell; a click wheel comprising an annular toothed member; a flange on said member extending radially inward and adapted to abut the end surface of said shaft; a sleeve extending axially from said toothed member and telescoping outside the keyed portion of said shaft; said sleeve having keyways registering with said shaft keyways and opening toward said end bell; and a locking spider consisting of a key for each of said keyways, and an annulus integral with said keys and encircling said sleeve.

4. In a fishing reel spool, in combination: a tubular shaft; end bells on said shaft; said shaft having a projecting end portion; said end portion having uniformly and symmetrically spaced keyways with their ends opening away from the adjacent end bell; a click wheel comprising an annular toothed member; a flange on said member extending radially inward and adapted to abut the end surface of said shaft; a sleeve extending axially from said toothed member and telescoping outside the keyed portion of said shaft; said sleeve having keyways registering with said shaft keyways and opening toward said end bell; and a locking spider consisting of a key for each of said keyways, and an annulus integral with said keys and encircling said sleeve.

5. In a fishing reel spool, in combination: a tubular shaft; end bells on said shaft; said shaft having a projecting end portion; said end portion having spaced keyways with their ends opening away from the adjacent end bell; a click wheel comprising an annular toothed member; a sleeve extending axially from said toothed member and telescoping outside the keyed portion of said shaft; said sleeve having keyways registering with said shaft keyways and opening toward said end bell; and a locking spider consisting of a key for each of said keyways, and an annulus integral with said keys and encircling said sleeve.

6. A fishing reel comprising, in combination: a framework including spaced head and tail end members; a stationary pintle carried by said framework; said pintle having a centrally located reach portion and bearing portions at both ends of said reach portion, both bearing portions being of smaller diameter than said reach portion; and rotary spool means supported on said pintle; said spool means having a tubular hub; said hub having a reach portion of greater diameter than the reach portion of said pintle to define an oil storage space; and bearing portions fitting the bearing portions of said pintle.

7. A fishing reel comprising, in combination: a framework including spaced head and tail end members; a stationary pintle carried by said framework; said pintle having a centrally located reach portion and bearing portions at both ends of said reach portion, both bearing portions being of smaller diameter than said reach portion; and rotary spool means supported on said pintle; said spool means having a tubular hub; said hub having a reach portion of greater diameter than the reach portion of said pintle to define an oil storage space; said hub having bearing portions at both ends of its reach portion to support said hub and spool means on said pintle.

8. A reel comprising, in combination: a framework including spaced head and tail end members; a rotary spool between said members having a tubular hub; a stationary bolt inside said hub; a stationary nut in one of said end members; said bolt having a threaded end received in said nut; and pawl and ratchet means between said bolt and said other member for restraining said bolt from unscrewing; said bolt being the sole means for holding at least one of said end members in assembled relation with the remainder of said framework; said pawl and ratchet means comprising ratchet teeth formed on said bolt; a spring-pressed pivoted pawl carried on the adjacent end member; and a manually accessible operating means for withdrawing said pawl to permit the unscrewing of said bolt; said operating means being a head integral with said pawl.

9. A reel comprising, in combination: a framework including spaced head and tail end members; a rotary spool between said members having a tubular hub; a stationary bolt inside said hub; a stationary nut in one of said end members; said bolt having a threaded end received in said nut; and pawl and ratchet means between said bolt and said other member for restraining said bolt from unscrewing; said bolt being the sole means for holding at least one of said end members in assembled relation with the remainder of said framework.

10. A reel comprising, in combination: a framework including spaced head and tail end members; a rotary spool between said members having a tubular hub; a stationary bolt inside said hub; a stationary nut in one of said end members; said bolt having a threaded end received in said nut; and pawl and ratchet means between said bolt and said other member for restraining said bolt from unscrewing; said pawl and ratchet means comprising ratchet teeth formed on said bolt; a springpressed pivoted pawl carried on the adjacent end member; and a manually accessible operating means for withdrawing said pawl to permit the unscrewing of said bolt; said bolt having axial facing abutment with the end member into which it is not threaded; whereby tightening of said bolt draws said end members toward each other and adjusts the axial clearance between said spool and said end members.

11. A reel comprising, in combination: a framework including spaced head and tail end members; a rotary spool between said members having a tubular hub; a stationary bolt inside said hub; a stationary nut in one of said end members; said bolt having a threaded end received in said nut; pawl and ratchet means between said bolt and said other member for restraining said bolt from rotating; said bolt being the sole means for holding both of said end members in assembled relation with the remainder of said framework; said pawl and ratchet means comprising ratchet teeth formed on said bolt; a spring-pressed pivoted pawl carried on the adjacent end member; and a manually accessible operating means for withdrawing said pawl to permit the rotating of said bolt.

12. In a fishing reel, in combination: a frame and housing assembly; a rotary spool in said assembly having an axially bored shaft; and a stationary bolt in said bore; said bolt constituting a pintle for said spool; said bolt having a bearing portion; then a reach portion; then a head portion including a shank of larger diameter than said reach portion; said reach having an annular groove adjacent said shank; and a ring fitting in said groove and having an outside diameter greater than said reach; said shaft having a bearing portion fitting the bolt bearing portion; a reach portion of larger diameter than said bolt reach and defining a storage space for lubricant between itself and said bolt reach, and a bearing portion fitting the outer surface of said ring; said bolt being of one metal; said shaft being of a second metal; and said ring being of a third metal.

13. In a fishing reel spool, in combination: a tubular shaft; end bells on said shaft; said shaft having a projecting end portion; said end portion having spaced keyways with their ends opening away from the adjacent end bell; an annular toothed member; a sleeve extending axially from said toothed member and telescoping outside the keyed portion of said shaft; said sleeve having keyways registering with said shaft keyways and opening toward said end bell; and a locking spider consisting of a key for each of said keyways, and an annulus integral with said keys and encircling said sleeve.

14. In a level wind fishing reel, in combination: a spool having end bells; a frame supporting said spool and including end members adjacent said end bells; one of said end members having a recess opening only toward the adjacent end bell and covered by said bell when the reel is in assembled condition; and a repair level wind pawl removably fastened in said recess; whereby said repair level wind pawl is inaccessible unless the reel is first disassembled.

15. In a fishing reel, in combination: a spool having end bells; a frame supporting said spool and including end members adjacent said end bells; one of said end members having a recess opening only toward the adjacent end bell and covered by said bell when the reel is in assembled condition; and a repair part removably fastened in said recess; whereby said repair part is inaccessible unless the reel is first disassembled.

16. In a level wind fishing reel, in combination: a spool having end bells; a frame supporting said spool and including end portions adjacent said end bells; one of said end portions having retaining means covered by said bell when the reel is in assembled condition; and a repair level wind pawl removably fastened in said retaining means; whereby said repair level wind pawl is inaccessible unless the reel is first disassembled.

JOSEPH A. COXE.
RICHARD P. McMAHON.